Oct. 23, 1956  C. P. SPAULDING  2,768,350
GALVANOMETERS
Filed Jan. 15, 1952

INVENTOR.
CARL P. SPAULDING
BY James B. Christie
ATTORNEY

United States Patent Office 2,768,350
Patented Oct. 23, 1956

2,768,350

GALVANOMETERS

Carl P. Spaulding, Pasadena, Calif., assignor, by mesne assignments, to Consolidated Electrodynamics Corporation, Pasadena, Calif., a corporation of California Application January 15, 1952, Serial No. 266,470

2 Claims. (Cl. 324—97)

This invention relates to improved galvanometers and particularly to galvanometers having a large figure of merit.

In conventional D'Arsonval galvanometers a small coil of wire is suspended in a magnetic field so that electric currents through the coil cause the coil to rotate in accordance with the magnitude and the polarity of the currents. A small mirror is affixed to the coil or to one of the supports for the coil so that the motion of the mirror is identical or substantially identical with the motion of the coil.

The figure of merit of a galvanometer is defined as the product of the sensitivity and the square of the natural frequency of the galvanometer.

The figure of merit of D'Arsonval galvanometers can be improved by using smaller mirrors, by increasing the flux density of the magnetic field, by decreasing the width of the coil, and by using wire of low density or of small diameter in the coil. Improvements of these factors have been pushed to the limits of practicability, and any large improvements in the figure of merit of galvanometers must be achieved by changes in the geometry of the galvanometers.

In accordance with my invention, a galvanometer having an improved figure of merit is provided by causing the deflection of the mirror to be large compared to the deflection of the coil of the galvanometer. The galvanometer coil and magnet assembly are arranged to cause the motion of the coil to be linear. The mirror is suspended between the coil and a fixed support, and the suspension structure for the mirror is maintained in torsion and under tension so that the angular position of the mirror varies in accordance with variations in the tension on the suspension structure which result from movements of the coil. In one embodiment of the invention, the mirror is suspended by a ribbon which extends between the coil and a fixed support, and the portions of the ribbon on each side of the mirror are twisted in opposite directions. In an alternative embodiment of the invention, the mirror is located at the junction between three wires which extend in the shape of an inverted Y. Two of the wires are connected to the coil, and the third wire, which is twisted so as to be in torsion, is connected to a fixed support.

The invention is explained with reference to the drawings, in which.

Figure 1:
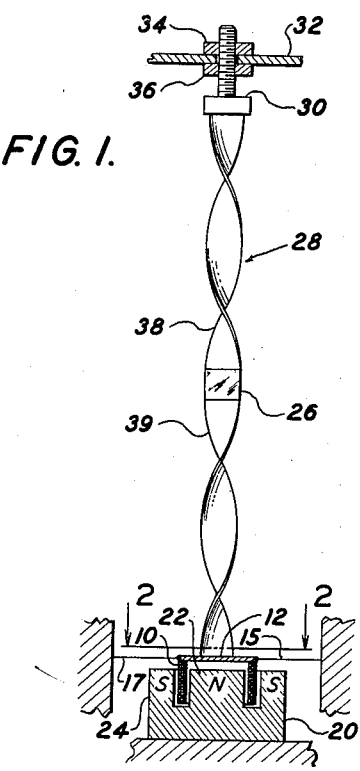
Fig. 1 illustrates the embodiment of the invention wherein a ribbon is employed to support the galvanometer mirror.
Figure 2:
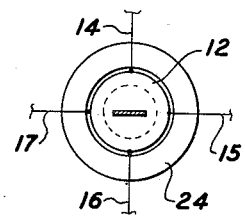
Fig. 2 is a sectional view along line 2—2 of Fig. 1.

As shown in Fig. 1, an annular coil 10 is secured to a rigid disk 12, and the coil and disk are supported by four fine wires 14 to 17 which are secured to the disk 12 and to a fixed support. The coil 10 is wound in one direction and it is provided with two leads (not shown) for connecting the coil to a source of electric current. The four wires 14 to 17 serve to carry the torque reaction of the suspension structure for the galvanometer mirror and to suspend the coil 10 in an annular channel in a magnet 20 so that the coil is permitted to move along its axis in response to the flow of electric current through the winding of the coil.

The center cylindrical portion 22 and the outer annular portion 24 of the magnet serve as the two poles of the magnet. Thus, the flux lines of the magnetic field extend radially between the poles of the magnet and are disposed at right angles to the axis of the coil.

The galvanometer mirror 26 is secured to a metallic ribbon 28 which has one end attached to the disk 12 and the other end attached to an adjustable member 30 which is secured to a fixed support 32 by a pair of nuts 34 and 36. The portion 38 of the ribbon which extends between the mirror and the fixed support is twisted in one direction, and the other portion 39 of the ribbon is twisted in the opposite direction so that the two portions of the ribbon are maintained in torsion. The tension on the ribbon 28 is adjusted by moving the member 30 up or down.

Linear movement of the coil 10 along a direction at right angles to the flux lines of the magnetic field of the magnet 20 in response to electric currents in the coil winding serves to vary the tension on the ribbon 28 and causes the angular deflection of the mirror to vary in accordance with the magnitude and the polarity of the electric currents.

The angular deflection of the mirror 26 in response to the flow of current through the coil 10 is determined by the torsion and the tension on the suspension structure for the mirror and it is ordinarily large compared to the displacement of the coil 10; hence the galvanometer can be designed to have a large figure of merit.

Figure 3:
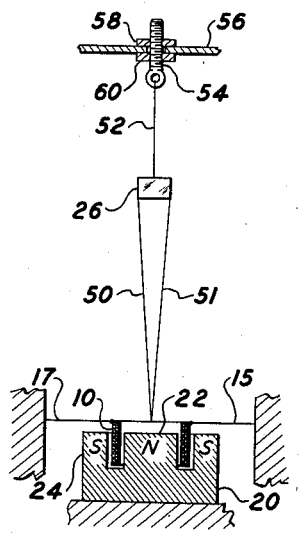
Fig. 3 illustrates an alternative embodiment of the invention.
Figure 4:
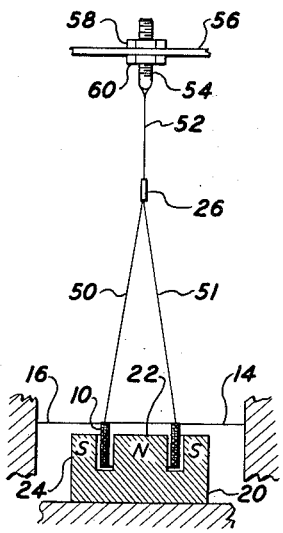
Fig. 4 is a side view of the apparatus shown in Fig. 3.

Figs. 3 and 4 show an alternative embodiment of the invention in which the galvanometer mirror is suspended by three wires 50 to 52. The wires 50 and 51 are secured to the outer end of the coil 10 at diametrically opposed locations and to opposite sides of the mirror. The wire 52 is secured to the midpoint of the upper side of the mirror and to an adjustable member 54 which is secured to a fixed support 56 by a pair of nuts 58 and 60.

The wire 52 is maintained under torsion, and the torsion and tension on the structure which suspends the mirror are adjusted by means of the adjustable member 54.

Movement of the coil 10 along a direction at right angles to the flux lines of the magnetic field of the magnet 20 in response to electric currents in the coil winding serves to vary the tension on the wire 52 and causes the mirror to rotate in accordance with the magnitude and the polarity of the electric currents. As before, the angular deflection of the mirror 26 in response to the flow of current through the coil 10 is determined by the torsion and the tension on the suspension structure for the mirror.

Since the motion of the galvanometer coil is linear, the galvanometer is subject to linear accelerations. Hence the galvanometer is primarily suitable for use in arrangements where large accelerations will not be encountered, or for use with high frequency currents which require that the galvanometer suspension assembly be stiff so that the reaction of the galvanometer to acceleration forces is small.

I claim:

1. A galvanometer comprising a magnet having a cylindrical pole and an annular pole located concentrically with respect to the cylindrical pole, an annular coil having a given null position, means for suspending the coil in the space between the poles of the magnet, a mirror having a given axis of rotation, having a reflecting side which forms a plane and having a given periphery, a pair of wires having first ends connected to two positions on the periphery and on opposite sides of the axis of rotation of the mirror and having second ends connected to diametrically opposite spaced points on the coil, said spaced points on the coil defining a line which is transverse to the plane of the mirror when the coil is at its null position, and a third wire being connected from a fixed support to a point on the periphery and on the axis of rotation of the mirror, means to maintain the pair of wires under tension and means to maintain the third wire in torsion so that displacement of the coil along a direction at right angles with respect to the magnetic field of the magnet causes angular deflection of the mirror.

2. In a galvanometer the combination comprising a coil having a given axis, being adapted to be displaced along the axis in accordance with an electrical current passing through the coil and having a given null position, a mirror having a given axis of rotation, having a reflecting side which forms a plane, a pair of wires having first ends connected to two positions on the mirror and on opposite sides of the axis of rotation of the mirror and having second ends connected to two spaced points affixed to the coil, said spaced points defining a line which is at a given angle with respect to the plane of the mirror when the coil is at its null position, and a third wire being connected from a fixed support to a point on the mirror, said point being on the axis of rotation of the mirror, means to maintain the pair of wires under tension and means to maintain the third wire in torsion so that displacement of the coil along its axis causes angular deflection of the mirror.

References Cited in the file of this patent

UNITED STATES PATENTS

| | | |
|---|---|---|
| 1,983,305 | Paulin | Dec. 4, 1934 |
| 2,033,318 | Abramson | Mar. 10, 1936 |
| 2,201,811 | Clothier | May 21, 1940 |
| 2,566,443 | Elmqvist | Sept. 4, 1951 |